June 12, 1934.    G. EGLOFF    1,962,181
TREATMENT OF HYDROCARBON OILS
Filed June 28, 1930
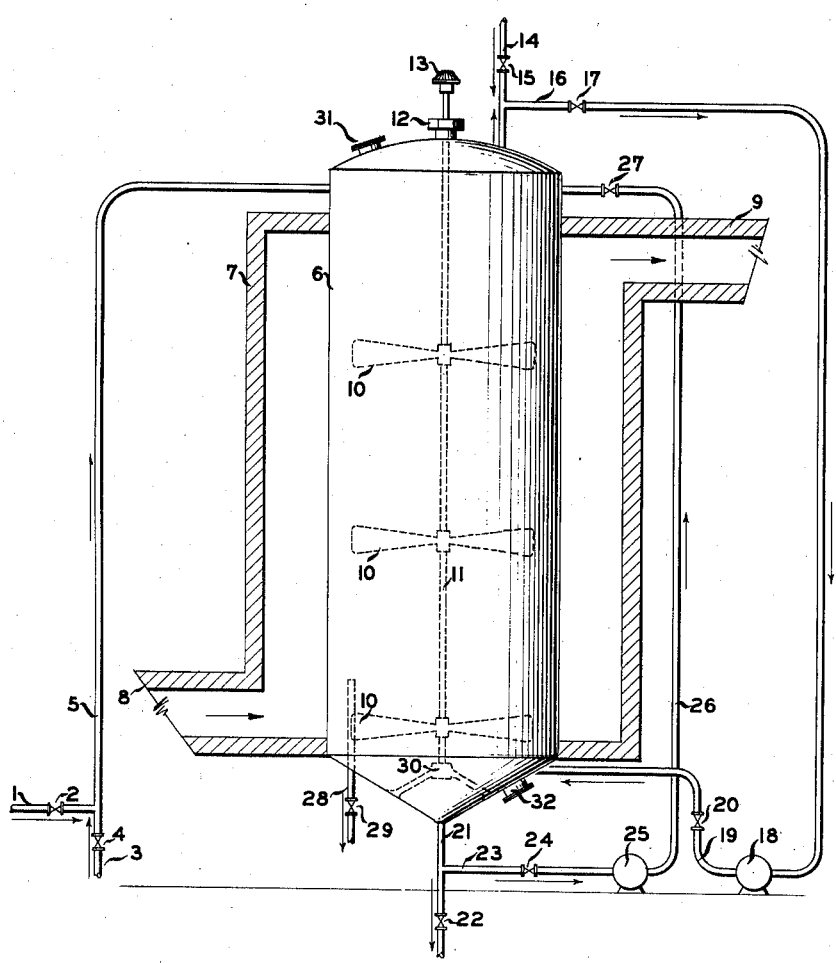
INVENTOR
GUSTAV EGLOFF
BY Frank L. Belknap
ATTORNEY Patented June 12, 1934

1,962,181

UNITED STATES PATENT OFFICE 1,962,181

TREATMENT OF HYDROCARBON OILS

Gustav Egloff, Chicago, Ill., assignor to Universal Oil Products Company, Chicago, Ill., a corporation of South Dakota Application June 28, 1930, Serial No. 464,511

2 Claims. (Cl. 196—45)

This invention relates to the treatment of hydrocarbon oils and refers more particularly to the refining of hydrocarbon oils to remove undesirable components and to improve the odor, color and stability of the hydrocarbon oils undergoing treatment.

Among the further objects of the invention is the removal of sulphur or sulphur-containing compounds.

The invention contemplates the provision of a process for the treatment of hydrocarbon oils with suitable treating agents at elevated temperatures and super-atmospheric pressures.

In one of its specific aspects the invention comprises subjecting hydrocarbon oils to contact with a treating agent at elevated temperatures and pressures for a sufficient length of time to permit bringing about the reaction, and thereafter separating the treating agent and/or reaction products from the treated oil, and if desired, subjecting the oil to further treatment.

In the treating agents, examples of which will be shown, I also include solvents which may be in simply physical solution to remove undesirable components from the oil undergoing treatment.

As examples of treating agents, the following are cited:

1. Inorganic and organic acids and their solutions, such as sulphuric, chlorosulphuric, hydrochloric, hypo-chlorous, phosphoric, acetic, etc.
2. Basic substances and their solutions such as alkalies, lime, ammonia, etc.
3. Salts and their solutions such as chlorides and nitrates of calcium, borium, titanium, aluminum, copper, etc.
4. Plumbites, antimonites, hypochlorites, etc.
5. Oxidizing agents and their solutions such as the oxides of phosphorus, hydrogen, peroxides, permanganates.
6. Sulphur, its compounds and their solutions.
7. Amalgams and low melting alloys.
8. Special compounds of hydrogen such as hydrogen selenide, hydrogen telluride, etc.
9. Halides of phosphorus.
10. Absorbent and adsorbent materials such as fuller's earth, clays, etc.
11. Gases or liquefied gaseous substances such as sulphur dioxide, sulphur trioxide, hydrogen sulphide, ammonia, chlorine, oxygen, nitrogen, the oxides of nitrogen, etc.
12. Organic substances including alcohols, aldehydes, ketones, esters, etc., and related compounds.

Mixtures of the above treating agents may be used or the treating agents may be used in a sequence of steps.

In order to more fully illustrate the invention, reference will be made to the diagrammatic drawing which is not to scale and which represents one of the many forms of apparatus suitable for carrying out the process of the invention.

Referring to the drawing the hydrocarbon oil to be treated may be pumped or directed to the process, cold or in a heated condition through line 1 regulated by valve 2 and the treating agent may be directed to the process in a cold or heated condition through line 3 regulated by valve 4 and flow through line 5 into the treating vessel 6 which is of suitable construction so as to withstand elevated temperatures and pressures and the action of the reagents. Line 5 may be enlarged and suitable mixing devices inserted so as to produce thorough mixing of the hydrocarbon oil and treating material before entering the treating vessel 6. This treating vessel may be insulated, or as in the present embodiment of the invention may be enclosed in a heated zone as illustrated by the furnace setting 7 through which heated gases flow, being introduced through the duct 8 and leaving through duct 9. The treating vessel may also be provided with agitating or stirring means as illustrated by paddles 10 which are disposed therein and mounted on shaft 11. This shaft is supported by thrust bearing 30 and extends through the top of the treater through the packing gland 12 which is packed to avoid loss of pressure. The shaft and paddles are operated through the gear 13 by means of any suitable actuating device, not shown. An extraneous gas or treating gas may be introduced into the treater through line 14 controlled by valve 15 and assist in maintaining the treating pressure. This gas may be recirculated so as to cause agitation and facilitate contacting by removing the gas from the top of the agitator through line 16 regulated by valve 17 and leading to the pump 18 which pumps this gas through line 19 and valve 20 into the lower part of the treater. Materials undergoing treatment may be removed from the process through line 21 regulated by valve 22 and may be directed to a cooler not shown before its disposal. The treating solution may be recirculated to the top of the treater by directing same through line 21 into line 23 regulated by valve 24 leading to pump 25 which directs this material through line 26 regulated by valve 27 to the top of the treater. Materials undergoing treatment may also be removed from the treater at various heights through line 28 regulated by valve 29, line 28 being so arranged that it can extend up into the treater 6 to any desired height. Solid treating agents may be introduced through the port 31 and the spent solids may be removed through port 32.

It is to be understood that the choice of temperatures and pressures will depend upon the reagents used, not only with respect to their boiling points but also with respect to the specific conditions and reactions involved.

As specific examples of the operation of the process of my invention in connection with the apparatus embodiment above described the following examples are given.

*Example No. 1.*—A California cracked distillate of approximately 50-52 A. P. I. gravity is treated at a temperature of approximately 300° F. under a pressure of approximately 125 pounds per square inch with dilute sulphuric acid of approximately 55-60° Baumé. After agitation by means of the stirrers and recirculation of gas the spent acid is removed, the hydrocarbon distillate washed and neutralized and the sulphur content of the treated product reduced from approximately 0.4% sulphur to approximately 0.1% sulphur.

I claim as my invention:

1. A process for refining hydrocarbon oils which comprises introducing the oil and a chemical refining agent to a treating zone and agitating the same therein, introducing a gas to the treating zone to build up a superatmospheric pressure therein, continuously removing such gas from the upper portion of said zone and injecting it into the lower portion thereof to assist in the agitation of the oil and agent, simultaneously removing refining agent from the lower portion of the treating zone and recycling the same to the upper portion thereof for re-use in the process, and separately withdrawing the treated oil.

2. A process for refining hydrocarbon oils which comprises introducing the oil and a chemical refining agent to a treating zone and agitating the same therein, introducing a treating gas to the treating zone to build up a superatmospheric pressure therein, continuously removing said treating gas from the upper portion of said zone and injecting it into the lower portion thereof to assist in agitation of the oil and agent, simultaneously removing refining agent from the lower portion of the treating zone and recycling the same to the upper portion thereof for reuse in the process, and separately withdrawing the treated oil.

GUSTAV EGLOFF.